(12) United States Patent
Fedane

(10) Patent No.: US 7,167,548 B1
(45) Date of Patent: Jan. 23, 2007

(54) METHOD AND APPARATUS FOR MODIFYING GAIN SETTINGS IN A CONNECTION INTERFACE

(75) Inventor: Rohit Anand Fedane, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 10/387,813

(22) Filed: Mar. 12, 2003

(51) Int. Cl.
*H04M 11/00* (2006.01)

(52) U.S. Cl. .............................. 379/93.06; 379/93.05; 379/93.01; 379/399.01

(58) Field of Classification Search ............ 379/93.01, 379/93.05, 93.06, 399.01; 375/220, 222, 375/231, 232

See application file for complete search history.

(56) References Cited

U.S. PATENT DOCUMENTS

| | | | |
|---|---|---|---|
| 6,345,071 B1* | 2/2002 | Hamdi | 375/222 |
| 6,704,351 B1* | 3/2004 | Ott et al. | 375/222 |
| 2001/0022810 A1* | 9/2001 | Joo | 375/222 |
| 2003/0076906 A1* | 4/2003 | Mujica | 375/345 |

* cited by examiner

*Primary Examiner*—Jefferey F. Harold
(74) *Attorney, Agent, or Firm*—Marger Johnson & McCollom, P.C.

(57) ABSTRACT

The operating characteristics of a network connection are modified to improve connection performance. Operating limits for the connection interface are identified. New gain setting are selected for the connection interface after the connection interface has finished a training session establishing a connection. The new gain setting are used by the connection interface to conduct a new training session. The new gain settings are selected for the connection interface when operating parameters for the connection are within the operating limits.

43 Claims, 4 Drawing Sheets

METHOD AND APPARATUS FOR MODIFYING GAIN SETTINGS IN A CONNECTION INTERFACE

BACKGROUND

During Digital Subscriber Line (DSL) training, two modems on opposite ends of a DSL connection test the DSL line to determine what bit rates can be used for transferring data in both an upstream and downstream direction. DSL training rates and the Signal-to-Noise Ratio (SNR) on a DSL connection is largely affected by the quality of the line in terms of its ability to carry a signal without distortion. For example, the signal on the DSL connection can degrade when the physical wire carrying the signal is subjected to external interference by electromagnetic sources.

Service providers provision DSL connections in either a rate adaptive mode or a fixed rate mode. The rate adaptive mode seeks to maximize the bit rate for a given line. The bit rate is dependent on the quality of the signal achievable on the line. The fixed rate mode forces the connection to a particular rate. If the line conditions are such that particular rate is not possible, the connection is not made, not even at a lower rate.

In both the rate adaptive mode and the fixed rate mode, the DSL modem training involves a Digital Subscriber Line Access Multiplexer (DSLAM) and Customer Premise Equipment (CPE) exchanging information about the quality of the signal received, or Signal-to-Noise Ratio (SNR). For example, a CPE modem may send out a known tone to the DSLAM. The quality of the tone is evaluated to determine the amount of interference in the DSL line.

The DSLAM and the CPE exchange the signal quality information from each other to determine the transmit (Tx) power (transmit gain) and the receive (Rx) power (receive gain or receiver sensitivity). The data rate on the DSL line is proportional to the Tx and Rx gain. However, excessive Tx gain will interfere with the Rx gain, and possibly disrupt other services in the network. Therefore, DSL modem training is conservative when setting gain values.

Although current implementations of rate adaptive mode are supposed to train the DSL modem at an optimum bit-rate, it is not the case in practice. This is because the rate adaptive algorithm attempts to guess the best rate(s) possible before steady-state operations (Showtime). These best rate(s) are then negotiated with the far end of the DSL connection. This algorithm often does not achieve the optimum bit-rate.

In the fixed rate mode, the DSL line may not train if the line conditions cause the SNR to fall below acceptable limits. However, if the SNR is at the boundary of the acceptable limit, there is no way to adjust the Tx or Rx gain in order to achieve a SNR that is acceptable.

There are times when a user may wish to have a better SNR than what the DSL chipset provides. But current DSL systems leave it up to the DSL chipset to determine the best training parameters. The training algorithms used in the DSL chipset are conservative due to a number of factors. For example, the DSL chipset makes guesses as to the best rates achievable in order to achieve quick training time. These guesses may not yield the best results. Also, a DSL chipset vendor has no knowledge of the PSD (Power Spectral Density) mask that is specific to a particular CPE. Using overly aggressive transmit power could violate transmission regulatory restrictions. To prevent transmission violations, the DSL chipsets use conservative gain parameters that may not provide the optimal transmit and receive gain settings.

DETAILED DESCRIPTION

Figure 1:
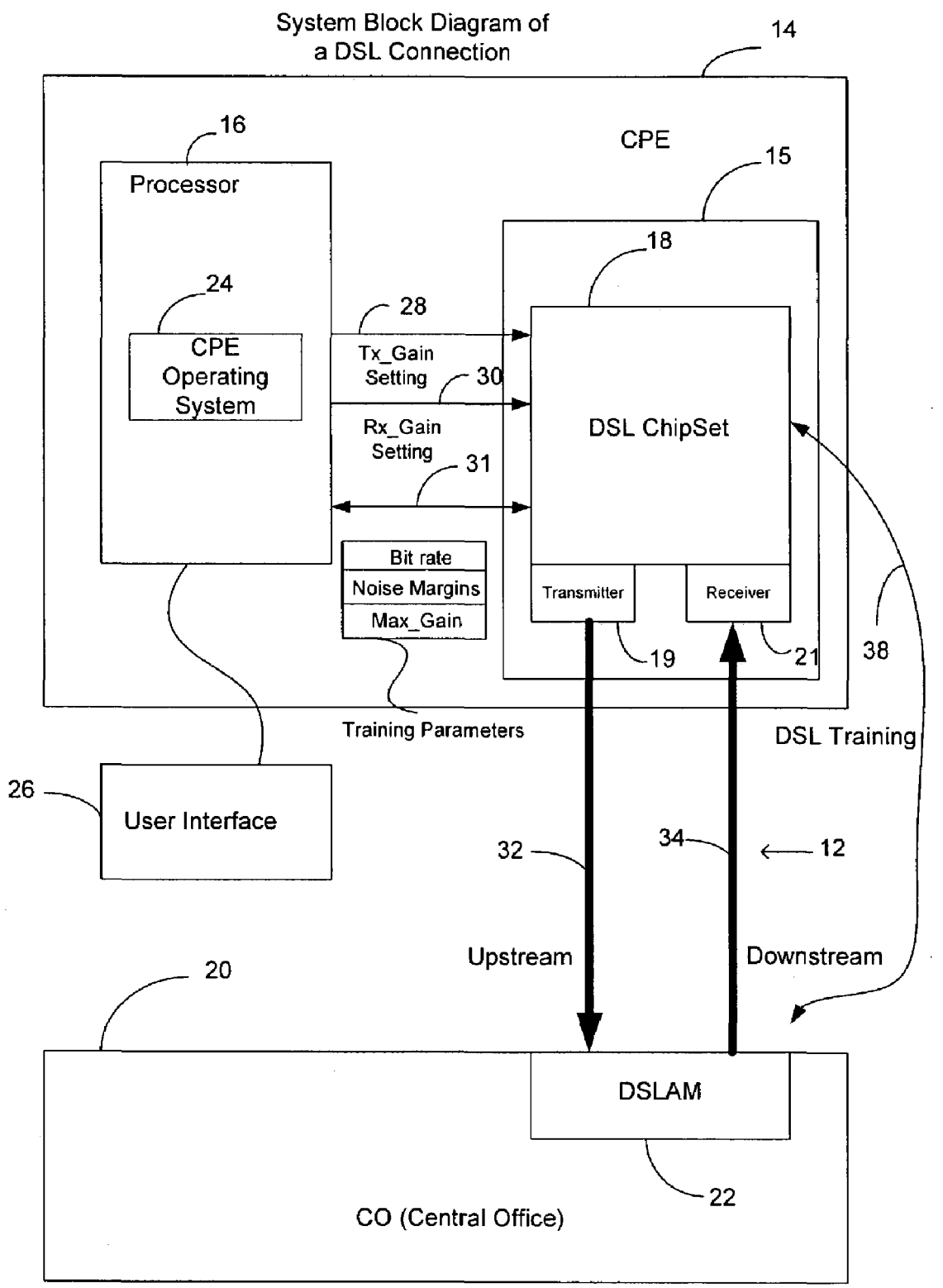
FIG. 1 is a block diagram showing a DSL connection according to one embodiment of the invention.

FIG. 1 shows the circuitry used for establishing a DSL connection 12 according to one embodiment of the invention. Customer Premise Equipment (CPE) 14 may be a Personal Computer (PC), router, switch, gateway, server, modem, or any type of network processing device that has the ability of establishing a DSL connection 12. In one example, the CPE 14 includes a DSL chipset 18 that includes a transmitter 19 and a receiver 21. The chipset 18 may be contained within a DSL modem 15. The DSL chipset 18 may be referred to generally as a DSL modem.

The DSL chipset 18 serves as an interface for establishing the DSL connection 12 with a DSLAM 22 located in a Central Office (CO) switch 20. The DSL chipset 18 and the DSLAM 22 are both known to those skilled in the art and are therefore not described in further detail. The DSL connection 12 includes a downstream path 34 used by the CO 20 to transmit data to the CPE 14 and an upstream path 32 used by the CPE 14 to transmit data to the CO 20.

The CPE 14 includes a processor 16 that operates CPE operating system software 24. A user interface 26 in one example is a computer screen and keyboard that allow an operator to select different transmit gains (Tx_Gain) 28, receive gains (RX_Gain) 30, and other parameters. Alternatively, the processor 16 can automatically modify the Tx_Gain 28 and the Rx_Gain 30. The TX_Gain 28 and RX_Gain 30 are modified to improve performance for the DSL connection 12 over what is typically achieved from a conventional DSL training session 38.

The performance of the DSL connection 12 is improved by first examining the SNR achieved at steady state or showtime. Steady state or showtime refers to the state of the DSL chipset 18 and the DSLAM 22 after completing the DSL training session 38. The Tx_Gain 28 and the Rx_Gain 30 are adjusted to increase the upstream or downstream steady state bit rate while still allowing the DSL connection 12 to operate within predefined PSD and SNR ranges. The SNR range is alternatively referred to as a noise margin.

EXAMPLE

The training process performed between the DSL chipset 18 and the DSLAM 22 result in upstream and downstream bit rates for the DSL connection 12 that operate within predetermined noise margins. For this example, after DSL training a steady state transmit (Tx_Gain) and steady state receive gain (Rx_Gain) produce a bit rate in the downstream path 34 of 6 Million Bits Per second (Mbps) and a SNR of 10 decibels (dbs). The upstream path has a bit rate of 700 thousand bits per second (Kbps) and a noise margin of 6 dbs.

TABLE 1.0

DSL Connection Parameters After Initial DSL Training

|  | Noise Margins | | |
| --- | --- | --- | --- |
| CPE Rx (downstream) | 6 Mbps | SNR | 10 db |
| CPE Tx (upstream) | 700 Kbps | SNR | 6 db |

The noise margin represents the amount of noise the upstream or downstream path can withstand without affecting the operating parameters of the DSL connection 12. For example, a noise margin of 0 dbs means that any noise on the path will result in possible Cyclic Redundancy Check (CRC) errors or some other type of error that would require the DSL chipset 18 to retrain to a lower bit rate for one or both of the upstream path 32 or downstream path 34.

An acceptable target SNR for both the transmit and receive path may be 6 db. Because the downstream path 34 for the DSL connection 12 currently has a noise margin of 10 db, the CPE 14 may be able to vary the Rx gain or Tx gain to increase bit rate performance and still stay within the acceptable 6 db upstream and downstream noise margins. For example, in one example the Tx_Gain 28 can be increased in order to increase the Tx bit rate in the upstream path 32. The DSL chipset 18 then retrains with the DSLAM 22 using the increased Tx_Gain 28. One example, of possible steady state operating parameters for the DSL connection after retraining with the increased Tx_Gain 28 are shown below.

TABLE 2.0

DSL Connection Parameters After Increasing Tx_Gain

|  | Noise Margins | | |
| --- | --- | --- | --- |
| CPE Rx (downstream) | 6 Mbps | SNR | 8 db |
| CPE Tx (upstream) | 740 Kbps | SNR | 6 db |

A new bit rate and noise margin are calculated by the DSL chipset 18 and sent back to the processor 16 after completion of the next training session. In this example, the new Tx_Gain increases the bit rate of the upstream path 32 from 700 Kbps to 740 Kbps. The increased Tx_Gain has the effect of reducing the SNR for the downstream path 34 from 10 db to 8 db. However, the 8 db noise margin is still within the acceptable 6 db range.

The bit rate and noise margins can be varied on the upstream path 32 at the expense of the bit-rate or noise margin on the downstream path 34. Alternatively, the Tx_Gain used in transmitter 19 can be decreased to enhance the bit-rate and improve the noise margin for downstream path 34. In another embodiment, the gain settings 28 and 30 can be modified to achieve a given SNR in either fixed mode or rate adaptive mode.

The transmit gain increase may be bounded by the lesser of the limits of the DSL chipset 18 and the maximum transmit power allowable without violating the PSD mask for the CPE 14. The transmit and receive gains are varied within these allowable limits to provide a desirable bit rate result that also has acceptable noise margins.

The processor 16 can automatically vary the Tx_Gain and Rx_Gain according to the training parameters 31 supplied by the DSL chipset 18. Alternatively, a user can manually modify the Tx_Gain, Rx_Gain, target bit rates, or other connection allowable limits, through the user interface 26.

Faster training can be achieved if the specified target bit rate is less than an optimal bit rate.

The operating limits for the transmit gain and receive gain are unique for every CPE architecture. For example, two different CPE's may use the same DSL chipset 18 but each different CPE architecture may have different gain limits. The system described above provides an improved solution to the DSL optimizations already implemented in the DSL chipset 18 firmware by modifying gain settings outside the DSL firmware, for example, by using processor 16.

Figure 2:
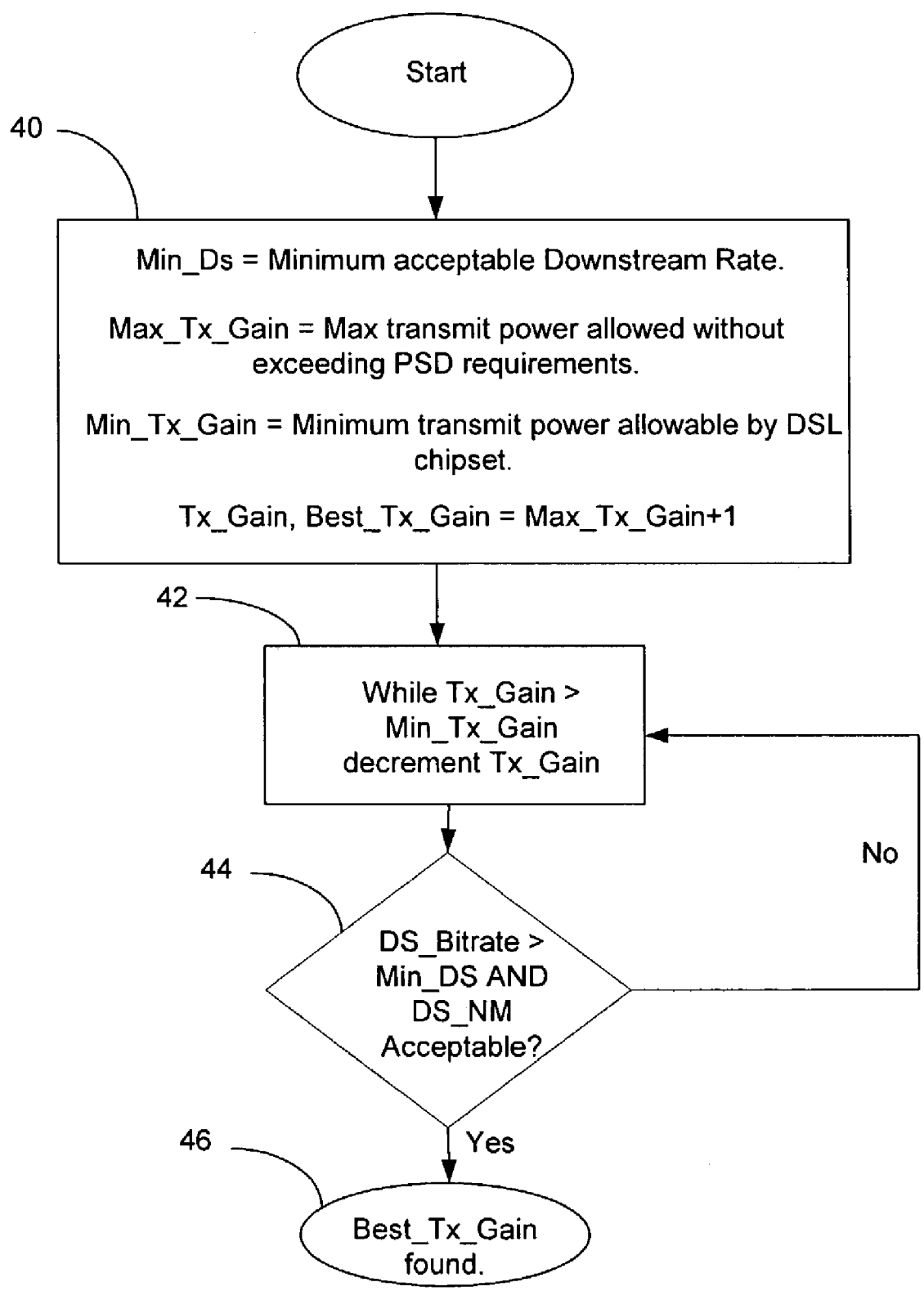
FIG. 2 is a block diagram showing one scheme for increasing performance for an upstream path of the DSL connection.

FIG. 2 is a flow diagram showing how performance can be increased in the DSL upstream path 32 (FIG. 1). Referring to FIGS. 1 and 2, in block 40 gain parameters are initialized in the CPE processor 16 or in the DSL modem 15. Examples of gain parameters include the minimum acceptable downstream bit rate (Min_DS), maximum transmit power allowed without exceeding PSD requirements (Max_Tx_Gain), and minimum transmit power allowable by DSL chipset 18 (Min_Tx_Gain).

The transmit gain (Tx_Gain) is initially set slightly above the maximum allowable transmit gain (Tx_Gain=Max_Tx_Gain+1). In block 42 the Tx_Gain is compared with the minimum allowable transmit gain Min_Tx_Gain. The Tx_Gain is reduced while Tx_Gain is greater than Min_Tx_Gain.

In block 44, a current downstream bit rate (DS_Bitrate) is compared with the minimum acceptable downstream bit rate (Min_DS). In one embodiment, the current downstream bit rate is determined by the DSL chipset 18 during a DSL training session. If the DS_Bitrate is less than the minimum allowable downstream bit rate (Min_DS) or the downstream noise margin (DS_NM) is outside an acceptable predetermined range in block 44, the operation moves back to block 42. In one embodiment, the acceptable downstream noise margins are specified by the CO 20, the CPE equipment manufacturer 14, or a combination of both.

The transmit gain (Tx_Gain) is reduced until the DS_Bitrate is greater than the minimum acceptable downstream bit rate (Min_DS) and the downstream noise margin (DS_NM) is within an acceptable range. Decision block 44 then moves to block 46 where the last selected transmit gain (Tx_Gain) is used as the final value for the DSL connection (Best Tx_Gain=Tx_Gain).

Thus, the processor 16 or DSL modem 15 readjusts the transmit gain (Tx_Gain) according to the downstream bit rate (DS_Bitrate) and the downstream noise margin (DS_NM) determined by the DSL chipset 18 during DSL training sessions.

Figure 3:
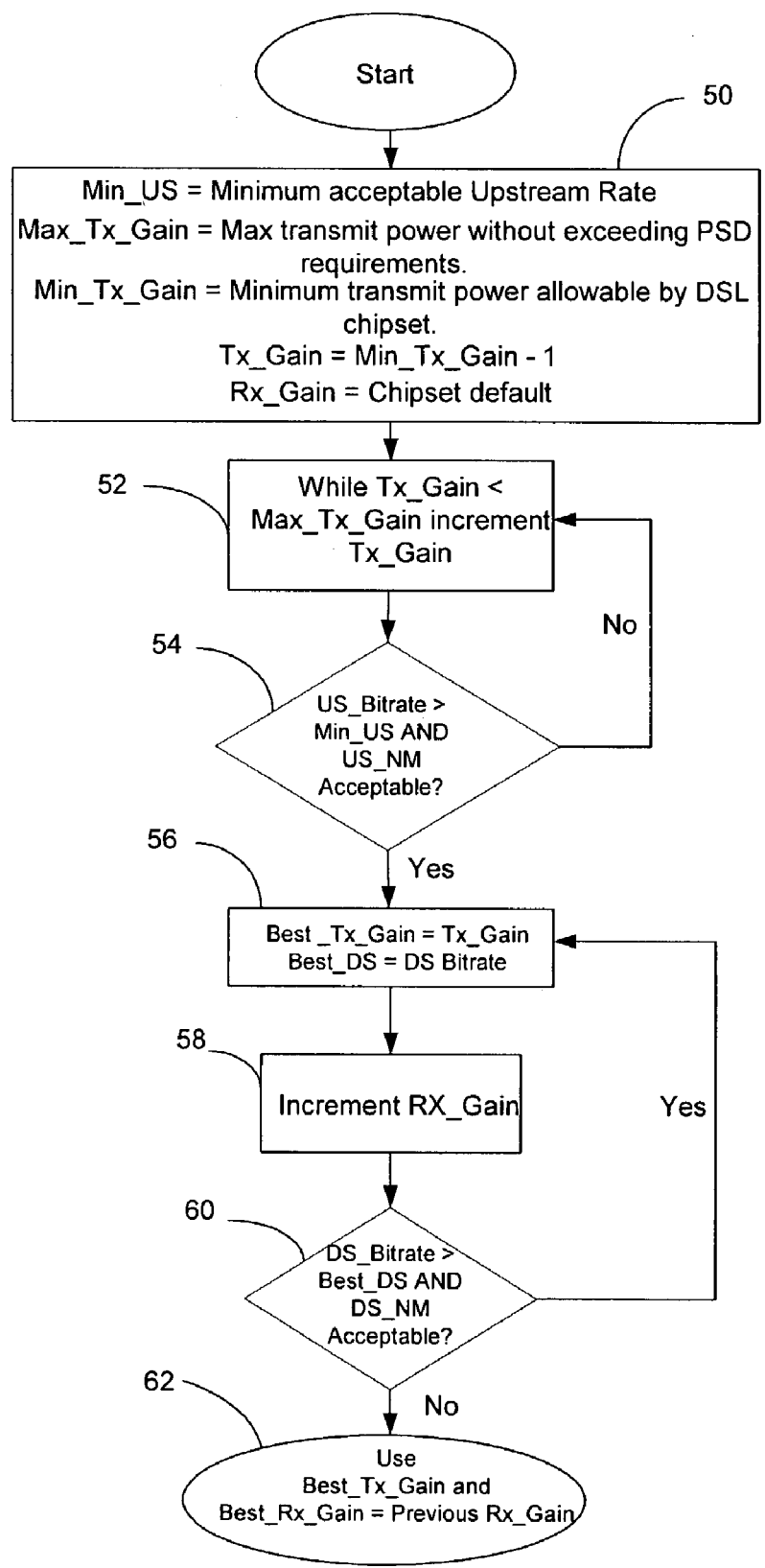
FIG. 3 is a block diagram showing one scheme for increasing performance for downstream path of the DSL connection.

FIG. 3 shows one example of a scheme for improving the performance of the downstream path 34 from the CO 20 to the CPE 14. Based on user requirements, it may be more important to optimize the bit rate for downstream path 34 (FIG. 1) as opposed to optimizing the bit rate for the upstream path 32 as described in FIG. 2. In one embodiment, an operator initiates the downstream optimization by typing a command to the processor 16 through user interface 26.

Referring to FIGS. 1 and 3, the parameters Max_Tx_Gain, Min_Tx_Gain, and minimum acceptable upstream bit rate (Min_US) are configured into the processor 16 or the DSL modem 15. The Min_US value defines the lowest acceptable bit rate for transmitting data on the upstream path 32 from the CPE 14 to the CO 20. The parameters may be stored in a memory (not shown) in the CPE 14 or modem 15.

The transmit gain (Tx_Gain) is initially set to a value slightly less than the minimum allowable transmit gain (Tx_Gain=Min_Tx_Gain−1). The receive gain Rx_Gain is set to a default value defined by the DSL chipset 18. In block 52, Tx_Gain is incremented while TX_Gain<Max_Tx_Gain. The Tx_Gain is increased until the upstream bit rate (US_Bitrate) is greater than Min_US and the upstream noise margin (US_NM) is within acceptable limits in block 54. Block 56 uses the final Tx_Gain setting as the best transmit gain Best_Tx_Gain=Tx_Gain for optimizing the downstream bit rate (Best_DS=DS_Bitrate).

In block 58, the receive gain (Rx_Gain) is varied to further improve the downstream bit rate. The Rx_Gain is varied by the DSL chipset 18 or DSL modem 15 by adjusting the operating power of the receiver 21. The chipset 18 then goes through another training process with the increased Rx_Gain value. The Rx_Gain is increased while the current bit rate (DS_Bitrate) is greater than the previously calculated downstream bit rate (Best_DS) and the downstream noise margins are within the acceptable range in block 58. The operations in blocks 58 and 60 are repeated until either the downstream bit rate (DS_Bitrate) is no longer greater than the previous best downstream bit rate (Best_DS) or the downstream noise margins are no longer within the acceptable range. Block 62 then uses the Rx_Gain value from the previous iteration and the Best_Tx_Gain value as the Rx_gain setting 30 and Tx_gain setting 28, respectively.

Figure 4:
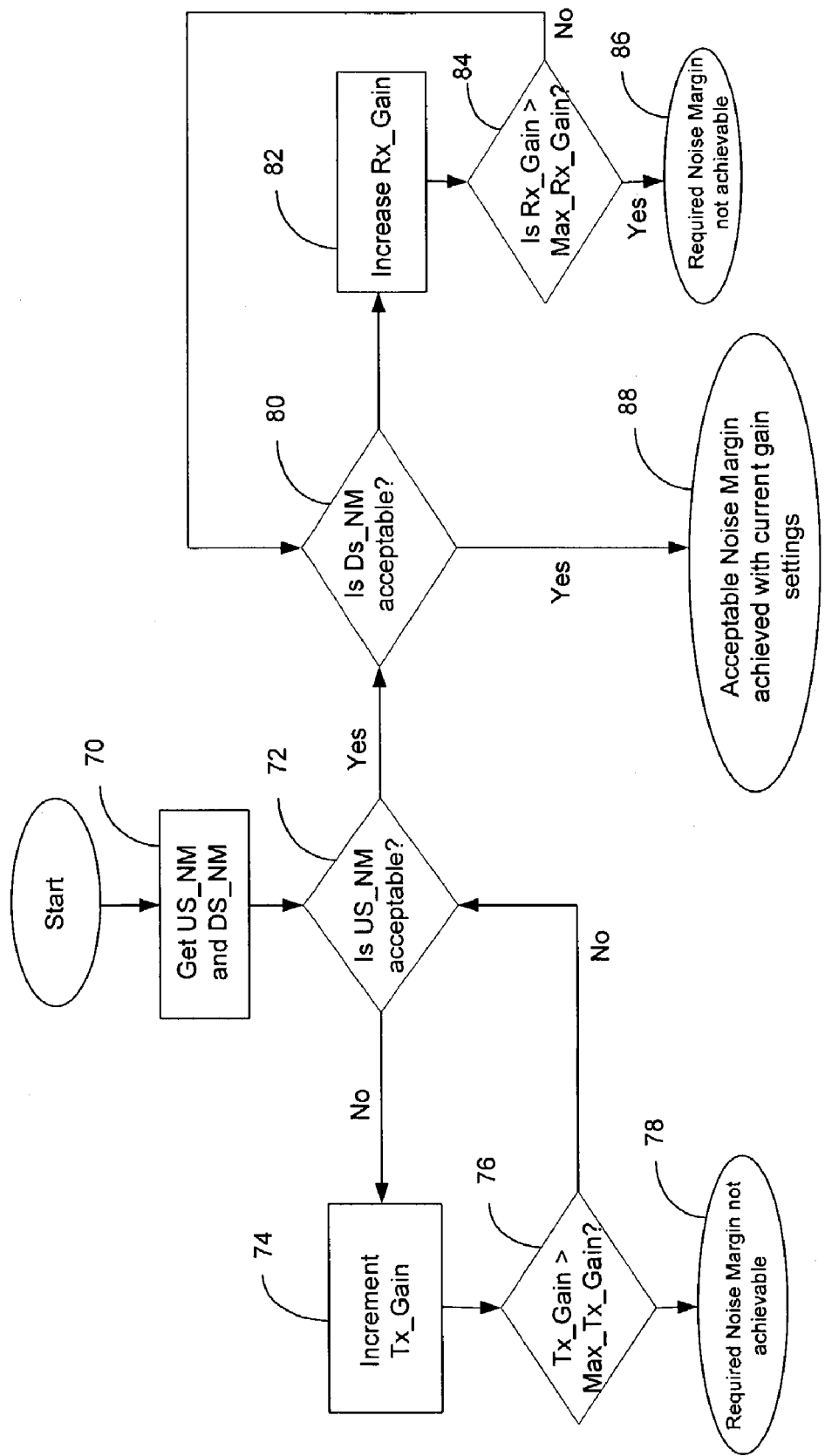
FIG. 4 is a block diagram showing one scheme for achieving upstream and downstream noise margins for the DSL connection.

FIG. 4 shows another technique for achieving upstream and downstream noise margins within predetermined limits. Referring to FIGS. 1 and 4, in block 70 the upstream noise margin (US_NM) and the downsteam noise margin (DS_NM) are obtained for the current Tx_Gain and Rx_Gain. For example, the DSL chipset 18 may send the noise margins to the processor 16 or DSL modem 15 after completing a training session. The noise margins in one example are signal to noise ratios given in decibel values. If the noise margin for the upstream path 32 (US_NM) is not within an acceptable predefined level in decision block 72, the Tx_Gain is increased in block 74.

If the Tx_Gain after being increased is greater than the maximum allowable transmit gain value (Max_Tx_Gain) in decision block 76, an indication is given in block 78 that the required noise margin cannot be achieved. If the Tx_Gain value is not greater than Max_Tx_Gain, then the increased Tx_Gain value is sent to the DSL chipset 18 and used for another DSL training session. If the upstream noise margin (US_NM) is still not acceptable with the increased Tx_Gain value in decision block 72, the Tx_Gain is increased again in block 74 and the process repeated.

If the upstream noise margin is acceptable in block 72, the downstream noise margin (DS_NM) is analyzed in block 80. If the DS_NM is within the acceptable range, the upstream and downstream noise margins are acceptable for the current gain settings in block 88.

If the DS_NM is not acceptable in decision block 80, the Rx_Gain is increased in block 82. If the increased Rx_Gain is larger than the maximum allowable receive gain (Max_Rx_Gain), then the processor 16 indicates the required noise margins are not achievable in block 86. If the Rx_Gain is not greater than the Max_Rx_gain, then the increased Rx_Gain setting is sent to the DSL chipset 18 for retaining and to calculate a new noise margin. The receive gain is increased until either the downstream noise margin comes within an acceptable level or the receive gain increases above the maximum acceptable receive gain (Max_Rx_Gain).

The values Min_DS, Min_US, Max_Tx_Gain, Max_Rx_Gain, Min_Tx_Gain, and the acceptable noise margins are predetermined parameters. These parameters can be saved in a memory (not shown) in the CPE 14 or modem 15. The processor 16 or DSL modem 15 can then load these parameters during a boot up process. Alternatively, these parameters may be loaded by an operator through interface 26. The processor 16 then automatically varies the transmit gain (Tx_Gain) and receive gain (Rx_Gain) by comparing these preloaded parameters to the bit rate and noise margins determined by the DSL chipset 18 during the DSL training process. Alternatively, a user can manually vary the gain settings through the user interface 26.

The operations above for increasing or decreasing gain can use any type of converging algorithm to search between the acceptable noise margins and bit rates values. In an alternative embodiment, the DSL chipset 18 contains circuitry for performing the operations described above. In another alternative embodiment, the gain settings are varied at the CO 20 or the DSLAM 22.

The schemes for selecting the transmit and receive gains can be used for any type of network connection where the upstream or downstream bit rate is negotiated and transmit or receive gains can be adjusted. For example, this gain adjustment scheme may be applicable to other types of digital and analog modems.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. All modifications and variations are claimed coming within the spirit and scope of the following claims.

The invention claimed is:

1. An apparatus, comprising:
one or more processors; and
a memory coupled to the processors comprising instructions executable by the processors, the processors operable when executing the instructions to:
establish an initial training session for a connection having a first bit rate and terminating on a modem, the initial training session established using initial default gain settings determined independently of actual power spectral density mask parameters that correspond to the modem;
identify the actual power spectral density mask parameters that correspond to the modem after completion of the initial training session;
generate custom gain settings that are configured to vary the connection to include a second bit rate that is greater than the first bit rate, the custom gain settings bounded according to the identified actual power spectral density mask parameters; and
conducting a new training session using the custom gain settings, the new training session varying the connection to include the second bit rate that is greater than the first bit rate.

2. The apparatus according to claim 1 wherein the sessions are established over a Digital Subscriber Loop (DSL).

3. The apparatus according to claim 1 wherein the custom gain settings include a transmit gain parameter.

4. The apparatus according to claim 3 wherein the processors are further operable to initially adjust the transmit gain parameter to a maximum allowable value and then reduce the transmit gain parameter until an opposite communication path in the connection operates within an acceptable noise margin.

5. The apparatus according to claim 3 wherein the processors are further operable to initially adjust the transmit gain parameter to about a maximum allowable value and then reduce the transmit gain parameter until an opposite communication path in the connection operates above a minimum predetermined bit rate.

6. The apparatus according to claim 3 wherein the processors are further operable to initially adjust the transmit gain parameter to about a minimum allowable value that corresponds to a DSL chipset associated with the modem and then increase the transmit gain parameter until a same communication path in the connection operates within an acceptable noise margin and bit rate.

7. The apparatus according to claim 6 wherein the processors are further operable to increase an initial receive gain as long as a varying bit rate for a same communication path of the connection increases and the noise margin for the same communication path is within predetermined acceptable levels.

8. The apparatus according to claim 1 wherein the processors are further operable to increment a transmit gain parameter for the connection until a noise margin for a first communication path of the connection reaches a predetermined acceptable level and increase a receive gain parameter until a noise margin for a second communication path reaches a predetermined acceptable level.

9. The apparatus according to claim 1 including a user interface for entering the custom gain settings and varying a transmit gain parameter.

10. The apparatus according to claim 1 wherein the custom gain settings are set according to user settings received from a remote endpoint having the modem.

11. A method for modifying the operating characteristics of a network connection, comprising:
identifying operating limits for a connection interface;
identifying completion of an initial training session that establishes the connection having an initial gain setting sufficient to maintain communications;
selecting a new gain setting for the connection interface after the connection interface has finished the initial training session;
submitting the new gain setting to the connection interface to conduct a new training session; and
selecting the new gain setting when operating parameters for the connection after the new training session are within the operating limits and provide improved performance over the initial gain setting.

12. The method according to claim 11 including:
identifying a maximum transmit power limit for the connection;
setting a transmit power for the connection interface to around the maximum transmit power limit;
identifying minimum allowable bit rate and acceptable noise margin operating limits for the connection; and
reducing the transmit power until the bit rate and noise margin are within the operating limits.

13. The method according to claim 12 including decreasing the transmit power for an upstream path of the connection until the bit rate and noise margin for a downstream path of the connection are within the operating limits.

14. The method according to claim 11 including:
identifying a minimum transmit power limit for the device;
selecting a transmit power for the interface to around the minimum transmit power limit;
identifying minimum allowable bit rate and acceptable noise margin operating limits for the connection; and
increasing the transmit power limit until the bit rate and noise margin are within the operating limits.

15. The method according to claim 14 including increasing the transmit power for an upstream path of the connection until the bit rate and noise margin for the upstream path of the connection are within the operating limits.

16. The method according to claim 15 including increasing a receive gain for the downstream path while a bit rate for the downstream path increases and a noise margin for the downstream path remains within the operating limits.

17. The method according to claim 11 including:
identifying an upstream and downstream noise margin for the connection;
increasing a transmit gain until the upstream noise margin is within the operating limits; and
increasing the receive gain until the downstream noise margin is within the operating limits.

18. The method according to claim 11 including:
using a Digital Subscriber Loop (DSL) chipset to vary the gain setting for a DSL connection until the DSL connection operates within the operating limits;
receiving operating parameters for the DSL connection from the DSL chipset; and
adjusting the power settings on the DSL chipset to improve performance of the DSL connection while maintaining the operating parameters within the operating limits.

19. The method according to claim 18 including:
receiving bit rates and noise margins for a current power setting from the DSL chipset; and
adjusting the gain settings using a processor according to the bit rates and noise margins received from the DSL chipset.

20. A method according to claim 11 including manually varying the gain setting through a user interface.

21. A Digital Subscriber Loop (DSL) interface, comprising:
a circuit configured to conduct an initial DSL training session that establishes operating parameters for a DSL connection within identified operating limits that are identified independently of power spectral density mask requirements for a modem that terminates the connection;
wherein the circuit after completing the training session receives adjusted gain settings that are generated according to the power spectral density mask requirements for the modem and the circuit conducts a new training session using the adjusted gain settings.

22. A DSL interface according to claim 21 wherein the circuit comprises a DSL chipset.

23. A DSL interface according to claim 21 wherein the gain settings are received from a processor in customer premise equipment or from a DSL modem.

24. A DSL interface according to claim 21 wherein the adjusted gain settings are initially set to a maximum allowable value and then reduced until noise margins for the DSL connection move within the operating limits.

25. A DSL interface according to claim 21 wherein the adjusted gain settings are initially set to a minimum allowable value and then increased until noise margins for the DSL connection move within the operating limits.

26. A DSL interface according to claim 21 wherein a transmit gain and a receive gain are both varied until an upstream noise margin and a downstream noise margin are both within predetermined limits.

27. A system for modifying the operating characteristics of a network connection, comprising:
means for identifying operating limits for a connection interface;
means for identifying completion of an initial training session that establishes the connection having an initial gain setting sufficient to maintain communications; and
means for optimizing the connection to improve bandwidth for the communications, the means for optimizing comprising:
means for selecting a new gain setting for the connection interface after the connection interface has finished the initial training session;
means for submitting the new gain setting to the connection interface to conduct a new training session; and
means for selecting the new gain setting when operating parameters for the connection after the new training session are within the operating limits and provide improved bandwidth over the initial gain setting.

28. The system according to claim 27 including:
means for identifying a maximum transmit power limit for the connection;
means for setting a transmit power for the connection interface to around the maximum transmit power limit;
means for identifying minimum allowable bit rate and acceptable noise margin operating limits for the connection; and
means for reducing the transmit power until the bit rate and noise margin are within the operating limits.

29. The system according to claim 27 including:
means for identifying a minimum transmit power limit for the device;
means for selecting a transmit power for the interface to around the minimum transmit power limit;
means for identifying minimum allowable bit rate and acceptable noise margin operating limits for the connection; and
means for increasing the transmit power limit until the bit rate and noise margin are within the operating limits.

30. The system according to claim 29 including means for increasing the transmit power for an upstream path of the connection until the bit rate and noise margin for the upstream path of the connection are within the operating limits.

31. The system according to claim 30 including means for increasing a receive gain for the downstream path while a bit rate for the downstream path increases and a noise margin for the downstream path remains within the operating limits.

32. The system according to claim 27 including:
means for identifying an upstream and downstream noise margin for the connection;
means for increasing a transmit gain until the upstream noise margin is within the operating limits; and
means for increasing the receive gain until the downstream noise margin is within the operating limits.

33. A system according to claim 27 including:
means for using a Digital Subscriber Loop (DSL) chipset to vary the gain setting for a DSL connection until the DSL connection operates within the operating limits;
means for receiving operating parameters for the DSL connection from the DSL chipset; and
means for adjusting the power settings on the DSL chipset to improve performance of the DSL connection while maintaining the operating parameters within the operating limits.

34. A system according to claim 33 including:
means for adjusting gain setting for the DSL chipset using a processor;
means for receiving bit rates and noise margins for a current power setting from the DSL chipset; and
means for adjusting the gain settings with the processor according to the bit rates and noise margins received from the DSL chipset.

35. An electronic storage medium containing code for modifying the operating characteristics of a network connection, the code operable when executed to:
identify operating limits for a connection interface;
identify completion of an initial training session that establishes the connection having an initial gain setting that is selected independently of a modem-specific power spectral density mask for a terminating modem;
select a new gain setting for the connection interface after the connection interface has finished the initial training session, the new gain setting selected according to the modem-specific power spectral density mask for the terminating modem;
submit the new gain setting to the connection interface to conduct a new training session; and
select the new gain setting when operating parameters for the connection after the new training session are within the operating limits.

36. The electronic storage medium according to claim 35 wherein the code is further operable to:
identify a maximum transmit power limit for the connection;
set a transmit power for the connection interface to around the maximum transmit power limit;
identify minimum allowable bit rate and acceptable noise margin operating limits for the connection; and
reduce the transmit power until the bit rate and noise margin are within the operating limits.

37. The electronic storage medium according to claim 36 wherein the code is further operable to decrease the transmit power for an upstream path of the connection until the bit rate and noise margin for a downstream path of the connection are within the operating limits.

38. The electronic storage medium according to claim 35 wherein the code is further operable to:
identify a minimum transmit power limit for the device;
select a transmit power for the interface to around the minimum transmit power limit;
identify minimum allowable bit rate and acceptable noise margin operating limits for the connection; and
increase the transmit power limit until the bit rate and noise margin are within the operating limits.

39. The electronic storage medium according to claim 38 wherein the code is further operable to increase the transmit power for an upstream path of the connection until the bit rate and noise margin for the upstream path of the connection are within the operating limits.

40. The electronic storage medium according to claim 39 wherein the code is further operable to increase a receive gain for the downstream path while a bit rate for the downstream path increases and a noise margin for the downstream path remains within the operating limits.

41. The electronic storage medium according to claim 35 wherein the code is further operable to:
identify an upstream and downstream noise margin for the connection;
increase a transmit gain until the upstream noise margin is within the operating limits; and
increase the receive gain until the downstream noise margin is within the operating limits.

42. The electronic storage medium according to claim 35 wherein the code is further operable to:
use a Digital Subscriber Loop (DSL) chipset to vary the gain setting for a DSL connection until the DSL connection operates within the operating limits;
receive operating parameters for the DSL connection from the DSL chipset; and
adjust the power settings on the DSL chipset to improve performance of the DSL connection while maintaining the operating parameters within the operating limits.

43. The electronic storage medium according to claim 42 wherein the code is further operable to:
adjust gain setting for the DSL chipset using a processor;
receive bit rates and noise margins for a current power setting from the DSL chipset; and
adjust the gain settings with the processor according to the bit rates and noise margins received from the DSL chipset.

* * * * *